United States Patent [19]

Traum

[11] 3,866,926
[45] Feb. 18, 1975

[54] CARBURETOR GASKET

[75] Inventor: Robert J. Traum, Trenton, Mich.

[73] Assignee: McCord Corporation, Detroit, Mich.

[22] Filed: Mar. 19, 1973

[21] Appl. No.: 342,329

[52] U.S. Cl. ............... 277/166, 261/65, 277/235 B
[51] Int. Cl. ............................................. F16j 15/10
[58] Field of Search ........ 277/166, 235, 235 B, 211, 277/215, 22; 261/65

[56] References Cited
UNITED STATES PATENTS

| | | | |
|---|---|---|---|
| 1,932,538 | 10/1933 | Sutcliffe | 277/235 B |
| 2,058,010 | 10/1936 | Fitch | 277/211 |
| 3,151,869 | 10/1964 | Butcher | 277/211 |
| 3,191,950 | 6/1965 | Hiltner | 277/211 |
| 3,231,289 | 1/1966 | Carrell | 277/166 |
| 3,462,161 | 8/1969 | Daubenberger et al. | 277/166 |
| 3,473,813 | 10/1969 | Meyers et al. | 277/166 |
| 3,490,776 | 1/1970 | Avery | 277/211 |
| 3,542,382 | 11/1970 | Hagmann | 277/211 |

Primary Examiner—Richard E. Aegerter
Assistant Examiner—Robert I. Smith
Attorney, Agent, or Firm—McGlynn and Milton

[57] ABSTRACT

A gasket assembly adapted to be disposed between two members particularly a carburetor and intake manifold of an internal combustion engine, including body means defining two parallel surfaces each of which is adapted to abut one of the members, an opening extending through the body means, and a sealing bead preferably of a silicone polymer material disposed about the periphery of the opening. The body means is molded from a non-metallic material, such as a mineral filled phenolic resin which has low thermal conductivity and low thermal expansivity and includes first recess means or channels for receiving and mounting the sealing bead therein such that the distance of compression of the sealing bead will equal at least 35% of its height. The body means further includes second recess means for defining heat insulating cavities between the members.

21 Claims, 3 Drawing Figures

3,866,926

CARBURETOR GASKET

This invention is related generally to a gasket assembly which is adapted to be disposed between two members and is particularly suited for use with internal combustion engines. More specifically, the instant invention is primarily adapted for sealing the carburetor of an internal combustion engine to the intake manifold thereof.

In recent years much work and effort has been expended for the purpose of developing a dependable gasket for use with today's sophisticated engines. A gasket for sealing the carburetor to the intake manifold must provide maximum sealability of fuel and air. This means not only that the gasket produce a good seal but also that the material of which the gasket is made is capable of withstanding the adverse environment produced by the fuel/air mixture passing into the intake manifold from the carburetor and the heat created by the engine.

A gasket assembly must provide maximum torque retention on the bolts holding the carburetor to the intake manifold. In other words, should the gasket assembly be subject to slow dimensional change due to the compression of the bolts, the tension on the bolts will thereby be reduced causing the connection between the carburetor and the intake manifold to loosen. Furthermore, there must be minimum distortion of the carburetor throttle body when it is bolted to the intake manifold. Since distortion of the throttle body is normally caused by dimensional inaccuracies or high spots in the gasket about which the throttle body distorts, the configuration of the gasket assembly must be such to allow close dimensional control.

The thermal properties of the material with which the gasket is made should afford minimum heat transfer from the intake manifold to the carburetor thereby reducing the likelihood of fuel vaporization within the carburetor. Furthermore, it is desirable that the material have low thermal expansivity in order that the dimensional integrity of the gasket will be maintained over the range of operating temperatures encountered in an internal combustion engine.

Heretofore, the best known developments in this area are represented by the patents to Farnam, et al., U.S. Pat. No. 3,655,210 and Rudder 3,153,541. The patent to Farnam, et al., is of particular interest; however, the gasket structure taught therein has definite undesirable characteristics. For example, the variety of materials employed each having different thermal characteristics cause various portions thereof to expand and contract at different rates thereby endangering the sealability of the gasket.

It is therefore an object and feature of the instant invention to provide a gasket assembly adapted to be disposed between two members including a unitary body means defining two parallel surfaces each of which is adapted to abut one of the members, an opening extending through the body means, and sealing bead means disposed about the periphery of the opening; the body means including first recess means for receiving the sealing bead means and second recess means for defining insulating cavities between the members.

Another object and feature of the instant invention is to make the body means of a non-metallic material having low thermal conductivity and low thermal expansivity and to make the sealing bead means of a fuel resistant elastomeric material.

In accordance with the foregoing object and feature it is therefore an object and feature of the instant invention to make the body means of a mineral filled phenolic resin and to make the sealing bead means of a fluorinated silicone elastomer.

Other objects and features of the instant invention will be readily appreciated as the same becomes better understood by reference to the following detailed description when considered in connection with the accompanying drawings wherein.

Figure 1:
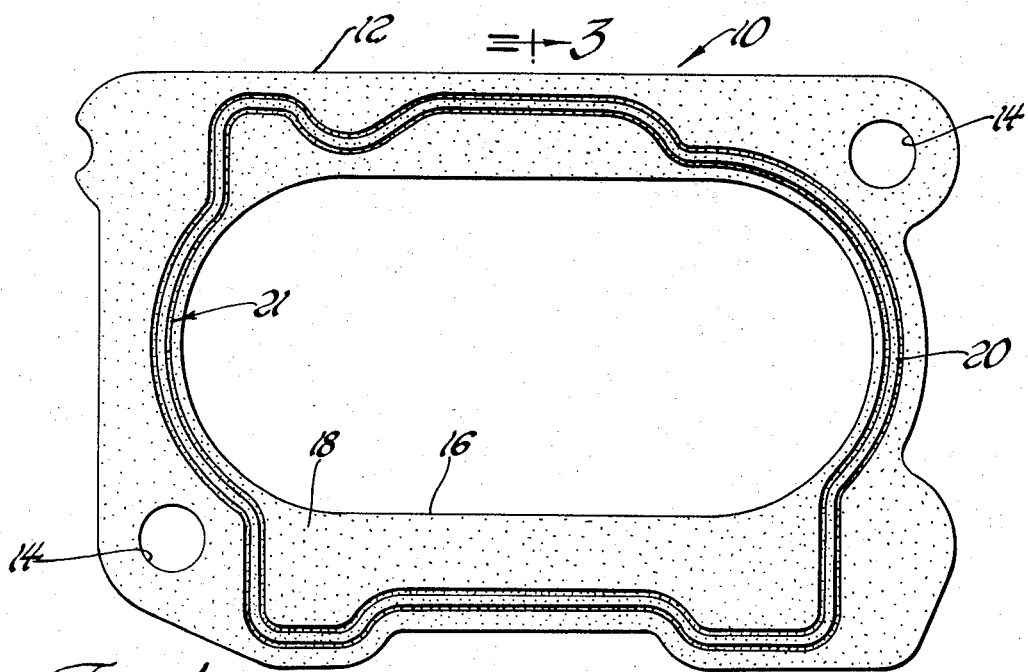
FIG. 1 is a plan view of the top surface of a gasket assembly constructed in accordance with the instant invention.
Figure 2:
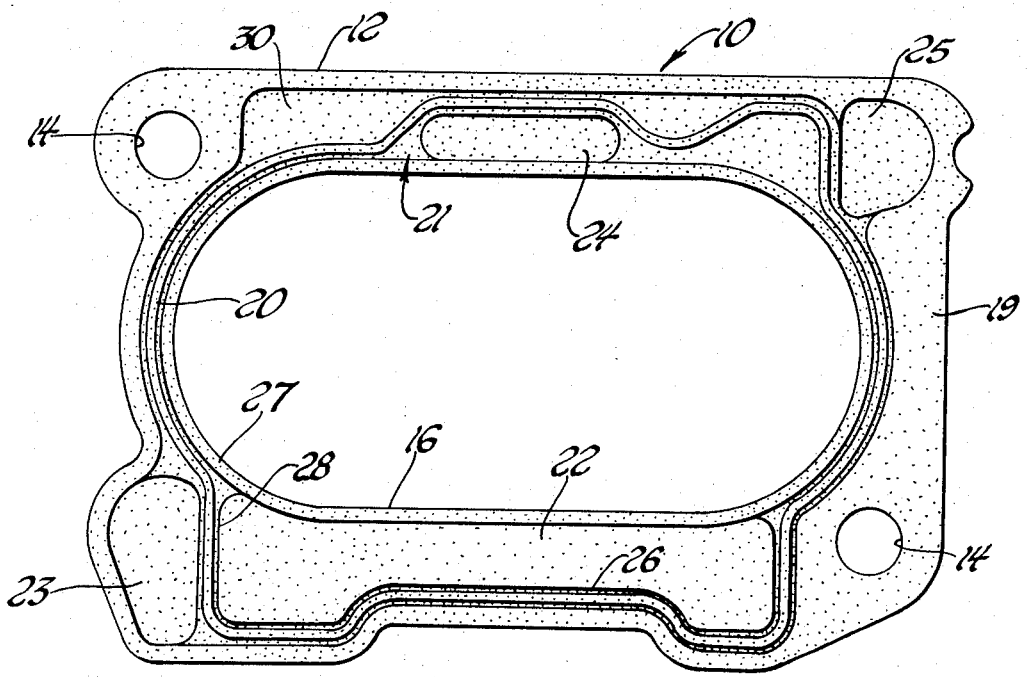
FIG. 2 is a plan view of the bottom surface of the gasket assembly shown in FIG. 1.
Figure 3:
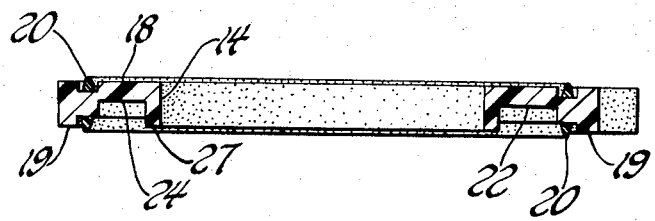
FIG. 3 is a cross-sectional view taken generally along line 3—3 of FIG. 1.

Referring to the drawings, a gasket assembly is generally shown at 10. The gasket assembly 10 includes unitary body means 12 which is made of a non-metallic material having low thermal expansivity and low heat conductivity. The particular material selected, therefore, is a phenolic resin and preferably a mineral filled phenolic resin such as asbestos.

The body means 12 is provided with a plurality of fastener receiving apertures 14 for receiving bolt fasteners which extend from the carburetor into the intake manifold to secure the carburetor thereto. A large centrally-disposed opening 16 extends through the body means 12 and defines a passageway for the flow of the fuel/air mixture from the carburetor into the intake manifold.

The body means 12 defines two parallel surfaces 18 and 19 each of which is adapted to abut one of the sealed members. In this case, surface 18 abuts the bottom surface of the carburetor throttle body and surface 19 abuts the upper surface of the intake manifold. The body means 12 is molded from the phenolic resin with strict attention being paid to the dimensional accuracy of the thickness thereof. The parallel surfaces 18 and 19 thereby produced provide large contact areas for abutting engagement with the sealed members. This structural feature is advantageous because, due to the large contact area, it provides a stable support base for the carburetor throttle body. More importantly, however, the parallel surfaces prevent distortion of the throttle body which is normally due to dimensional inaccuracies. Dimensional inaccuracies are difficult to correct if the gasket is comprised of a number of parts; however, the two surfaces of the unitary body means 12 are easily controlled to maintain accurate parallelism. Furthermore, since the phenolic resins are substantially incompressible, there is maintained an extremely high degree of torque retention once the bolt fasteners have been torqued down. This, therefore, prevents the carburetor from loosening on the intake manifold, a problem which is normally due to the slow compression of the gasket material after installation of the carburetor.

To provide maximum sealability for the fuel/air mixture passing from the carburetor to the intake manifold, sealing bead means comprising a sealing bead 20 is disposed about the periphery of the opening 14 on both sides of the body means 12. The sealing bead 20 must be of a pliable, resilient material to produce a good seal between the sealed members. Additionally, however, it must be capable of withstanding the adverse environment created by the fuel/air mixture. The sealing bead 20 is therefore made of a fuel resistant elastomeric material and preferably a fluorinated silicone elastomer. Fluorosilicone is not only fuel resistant, but it is substantially unaffected by the heat encountered during service, therefore, it comprises an extremely attractive sealing material.

The body means 12, which in effect functions as a carrier plate for carrying the sealing bead 20, includes first recess means comprising a mounting portion or recessed channel generally indicated at 21 for receiving the sealing bead 20. A recessed channel 21 is disposed in both surfaces 18 and 19 thus providing a mounting site for the sealing bead 20 on both sides of the body means 12.

One of the surfaces, the bottom surface 19, of the body means 12 includes second recess means which define insulating cavities 22, 23, 24 and 25 or air gaps between the sealed members. The cavities 22, 23 24 and 25 are generally irregularly shaped, the depth of each of the cavities being greater than the depth of the first recess means or recessed channel 21. In other words, the cavities are adapted to provide the largest volume of air space possible between the sealed members. Consequently, the recessed channel 21 disposed in the bottom surface 19 is not always in the form of a channel as is the case on the top surface 18 and adjacent the curved ends of the opening 16 on the bottom surface 19. The recessed channel or mounting portion 21 takes the form of a raised shelf 26 as it extends adjacent the cavity 22 and forms a bridge-like member 28 as it extends between the cavities 22 and 23. The mounting portion 21 also broadens to form a wide plateau-like area 30 in which another cavity 24 is disposed.

The depth of the recessed channel or mounting portion 21 below the surface 18 or 19 of the body means 12 is maintained such that the height of the sealing bead 20 is greater than the depth of the recessed channel or mounting portion 21. It has been found that the maximum sealability of the sealing bead 20 is produced when the sealing bead 20 is compressed a distance equal to at least 35% of its height, therefore, it is desirable to make the depth of recessed channel no more than 65% of the bead height, to give maximum sealability. It is also noted, however, that the sealing bead 20 fractures or breaks up if it is subjected to extreme compression. Fracturing of the sealing bead does not occur if the compression does not exceed 55% of the height of the bead, therefore, the depth of the recessed channel cannot be less than 45% of the bead height. The depth of the recessed channel 21 on which the sealing bead 20 is mounted, falls within the range of 65% – 45% of the height of the sealing bead to give maximum sealability and to prevent loss of the seal by fracturing.

Returning to the second recess means or insulating cavities 22, 23, 24 and 25, these regions as hereinbefore stated define air gaps. These cavities or air gaps substantially reduce heat transfer to the carburetor thereby reducing the possibility of fuel vaporization within the carburetor. It is contemplated that these cavities be entirely enclosed on all sides but the side adjacent the opening 16. It has been found, however, that stagnated or dead air gaps provide superior heat insulating qualities. It is therefore desirable to include the wall-like portion 27 around the opening 16 which encloses the open side of the cavities to form stagnated or dead air gaps. Furthermore, the wall 27 prevents turbulent action of the fuel/air mixture. In terms of structural stability the use of the insulating cavities is preferred because a large area of the body means 12 may be employed to support the throttle body about the entire connecting flange thereof rather than at isolated locations, normally bushings located at the fastener receiving apertures as is the case in other gasket constructions. In other words, the required heat insulation is provided while substantially increasing the support area and thereby facilitating stability.

An additional advantage of the gasket assembly 10 is that it is molded into a unitary structure which is adapted to carry the sealing bead 20. Since the body means 12 of the gasket assembly 10 is made of one piece, any slight dimensional changes due to the heat will be the same throughout. This is contrasted with a gasket assembly which includes many parts each having different coefficients of thermal expansion whereby each part reacts differently to the heat, thereby upsetting the sealability of the gasket assembly.

While a specific form of the invention has been illustrated and described in the foregoing specification and accompanying drawings, it is to be understood that the invention is not limited to the exact instructions shown but that various alternatives in the construction and arrangement of parts will become apparent to those skilled in the art without departing from the scope and spirit of the invention as set forth in the depending claims.

The embodiments of the instant invention in which an exclusive property or privilege is claimed are defined as follows:

1. A gasket assembly adapted to be disposed between two members comprising: body means defining two parallel surfaces each of which is adapted to abut one of the members, an opening extending through said body means, and sealing bead means disposed about the periphery of said opening; said body means including first recess means for receiving said sealing bead means and second recess means for defining insulating cavities between the members.

2. An assembly as set forth in claim 1 wherein said second recess means defines stagnated cavities enclosed on all sides when disposed between the members.

3. An assembly as set forth in claim 2 wherein the depth of said second recess means is greater than the depth of said first recess means.

4. An assembly as set forth in claim 3 wherein both parallel surfaces of said body means include first recess means, and first recess means defining a mounting portion for supporting said sealing bead means.

5. An assembly as set forth in claim 4 wherein the height of said sealing bead means is greater than the depth of said first recess means below the surface of said body means.

6. An assembly as set forth in claim 5 wherein said sealing bead means is compressed a distance equal to at least 35% of its height.

7. An assembly as set forth in claim 6 wherein the depth of said first recess means does not exceed 65% of the height of said sealing bead means.

8. An assembly as set forth in claim 7 wherein the depth of said first recess means is greater than 45% of the height of said sealing bead means.

9. An assembly as set forth in claim 5 wherein said body means includes a plurality of fastener receiving apertures.

10. An assembly as set forth in claim 9 wherein said opening defines a passageway between the members.

11. An assembly as set forth in claim 10 wherein said body means is made of a non-metallic material having low thermal expansivity and low heat conductivity.

12. An assembly as set forth in claim 11 wherein said material is a phenolic resin.

13. An assembly as set forth in claim 12 wherein said material is a mineral filled phenolic resin.

14. An assembly as set forth in claim 11 wherein said sealing bead means is made of a fuel resistant elastomeric material.

15. An assembly as set forth in claim 14 wherein said material is a fluorinated silicone elastomer.

16. An assembly as set forth in claim 3 wherein said body means is made of a non-metallic material having low thermal expansivity and low heat conductivity.

17. An assembly as set forth in claim 16 wherein said material is a phenolic resin.

18. An assembly as set forth in claim 17 wherein said material is a mineral filled phenolic resin.

19. An assembly as set forth in claim 18 wherein said material is a fluorinated silicone elastomer.

20. An assembly as set forth in claim 1 wherein said sealing bead means is made of a fuel resistant elastomeric material.

21. A gasket assembly adapted to be disposed between two members comprising: body means defining two parallel surfaces each of which is adapted to abut one of the members, an opening extending through said body means, and sealing bead means disposed about the periphery of said opening; said body means including first recess means for receiving sealing bead means and second recess means for defining insulating cavities each of which are enclosed on all but the side adjacent said opening for communication therewith when disposed between the members.

* * * * *